Patented Jan. 31, 1933

1,895,528

UNITED STATES PATENT OFFICE

HUGH STOTT ~~~~~, ~~ ~~~~~, ~~~ JERSEY, AND WILBUR A. LAZIER, OF WILMINGTON, DELAWARE, ASSIGNORS TO E. I. DU PONT DE NEMOURS & COMPANY, OF WILMINGTON, DELAWARE, A CORPORATION OF DELAWARE

CATALYTIC DEHYDRATION AND DEHYDROGENATION PROCESS

No Drawing. Application filed June 24, 1926. Serial No. 118,356.

This invention relates to catalytic processes of dehydrogenation and dehydration of organic compounds wherein an oxide catalyst is used together with a substance that has the effect of repressing either the dehydrogenation or dehydration.

In the field of organic chemistry, the production of numerous important compounds depends on the ease and completeness with which a molecule of hydrogen or one of water may be detached from a single molecule or from two different molecules of more available or less costly compounds. Such reactions are conveniently termed dehydrogenations or dehydrations, depending on the minor products of reaction and together constitute two of the most important classes of organic reactions.

Dehydrations are necessarily restricted to oxygen-containing compounds, the preparation of ethers or olefins from alcohols being familiar examples. In general, condensations which take place with the elimination of water may be considered dehydrations. As examples of such condensations by dehydration, the formation of mesityl oxide and phorone from acetone and the preparation of ethers from alcohols may be cited. Dehydrogenations are broader in their application because hydrocarbons and other non-oxygen-containing organic compounds may be dehydrogenated as well as compounds containing the hydroxyl group. The terms "dehydrogenation" and "dehydrogenation reaction" as used throughout the specification and claims are intended to exclude oxidation reactions in which oxygen or its equivalent is caused to react with hydrogen containing compounds to form reaction products containing a less amount of hydrogen. The mechanism of oxidation reactions of this type is entirely different from that involved in reaction wherein hydrogen atoms are split off from hydrogen-containing compounds to produce molecular hydrogen. The removal of hydrogen from cyclohexanol to form phenol is a familiar example of the detachment of hydrogen directly linked to carbon, while the preparation of acetaldehyde from ethanol, or acetone from isopropanol illustrates dehydrogenation of the hydroxl group.

It is well known that in order to bring about a practical speed of dehydrogenation or dehydration, the process must be conducted at elevated temperatures so the reactions are usually carried out in the vapor phase. The use of certain catalysts or porous inorganic solids possessing extensive surfaces also greatly facilitates the reactions. As most catalytic masses are not strictly specific in their action, the conditions necessary for operation tend to aggravate the undesired side reactions. It is particularly difficult to select contact materials which will cause only dehydrogenation or dehydration of alcohols, the greater number being more or less mixed in their behavior. In certain cases it has been found that the more active catalysts are often mixed catalysts while the "pure" catalysts possess very inferior activity.

As has been mentioned, one of the most important and familiar uses of dehydrogenation and dehydration reactions is in treating alcohols to obtain ethers, aldehydes, ketones or olefins. When subjected to dehydrogenating influences, primary alcohols yield aldehydes and secondary alcohols yield ketones, the other product, of course, being hydrogen. Tertiary alcohols are not capable of dehydrogenation and undergo only dehydration. Methanol is dehydrated to dimethyl ether, while all other alcohols readily yield unsaturated hydrocarbons under the influence of dehydrating catalysts.

It is known that reduced metals such as copper, iron, or nickel are especially efficacious for the strict dehydrogenation of alcohols, but often are so vigorous in their action that the aldehydes or ketones formed are split up with the formation of carbon monoxide and saturated hydrocarbons. Other disadvantages of these metallic catalysts are their extreme sensitivity to catalyst poisons, particularly sulfur compounds, and their tendency to sinter, i. e., to deteriorate under the influence of high temperature.

It has been known for a long time that non-reducible or slowly reducible oxides are catalysts for the dehydrogenation or dehydration of alcohols. For example, the oxides of aluminum and thorium have marked dehydrating properties. Others such as magnesia are predominatingly dehydrogenating, while still others such as chromium oxide giving mixed reactions are scattered between these. Sabatier (Catalysis in Organic Chemistry) has arranged the non-reducible oxides in order of their tendencies to dehydrate or dehydrogenate alcohols, but recent investigators have shown that such a rigid classification is not valid, as the behavior of the catalytic oxide is dependent in part on its method of preparation.

According to the present invention, the dehydrogenating or dehydrating character of oxide catalysts may be profoundly altered by the addition of small amounts of substances which of themselves may have little or no effect on the reaction. We have found in particular that the alkali and alkali earth metals in the form of their oxides, carbonates, hydroxides, or salts with feeble acids such as organic acids, exercise a marked repressing effect on the dehydration reactions while strongly acidic oxides in the form of acids, ammonium salts or anhydrides have a similar effect in repressing dehydrogenation. Zinc oxide which normally gives about 5% of dehydration and 95% dehydrogenation, becomes a dehydration catalyst by the addition of 10% of zinc sulfate. In a similar manner, the 5% of dehydration normally present entirely disappears after the addition of a few percent of sodium carbonate to the catalyst. This invention now makes it possible to select a suitable catalyst from the standpoint of durability, activity, and insensitivity to poisons, and then so to alter the qualitative performance of the mass as to suit the needs of the process in question. We have found that the effect of carbonates, oxides, or hydroxides of alkali or alkali earth metals, or of acid oxides in general in its application and that the qualitative behavior of any oxide catalyst is altered by the addition of any base, or of any oxide markedly more acidic than the oxide treated.

Most oxide catalysts that can be used for the dehydrogenation or dehydration respectively of organic compounds, do not have a single effect, that is, they do not cause the reaction to proceed entirely in the desired direction but give rise to a mixed dehydrogenation and dehydration. Among such oxide catalysts may be named the following: the oxides of berryllium, magnesium, zinc, aluminum, silicon, titanium, germanium, zirconium, tin, cerium, thorium, vanadium, bismuth, chromium, molybdenum, tungsten, uranium, manganese, iron, or any of the rare earths, etc. Each oxide has its own peculiar normal effect in the reaction as regards the relative proportions or moles of dehydrogenated and dehydrated product produced. This effect can be changed and controlled by the addition to the oxide catalyst of another substance that may itself have no effect on the reaction, but which, nevertheless, will exert a very profound effect on the catalyst, causing it to act selectively so as to repress or suppress one of the dehydrogenating or dehydrating reactions taking place. This repression of either the dehydrogenation or dehydration, as the case may be, was hitherto unrecognized in the art so that there not only was no possible control of such reactions in the desired direction, but there was also no practical means of utilizing any desired oxide catalysts for a particular reaction. We accordingly designate those substances having such repressive or suppressive effects by the general term repressers or repressives, indicating thereby that the action may be either partial or complete in eliminating one of the dehydrogenating or dehydrating effects, while we indicate by the term suppresser or "suppressive" a substantially total repressive effect. These repressers are neither to be considered components or constituents of mixed catalysts, nor are they to be considered promoters or activators although these additional attributes may, in special cases, also be present incidentally.

Such oxide catalysts as enumerated above may be treated with a compound of one of the alkali or alkali earth metals of groups 1 and 2 of the Periodic Table, either in the form of their oxides, carbonates, hydroxides, or salts with weak acids, etc., for the purpose of repressing the dehydration and thereby making the process more entirely one of dehydrogenation. In particular cases the effect will be almost, if not entirely, total, depending on the nature of the catalyst and the represser and the quantity thereof employed, which will vary in particular cases but which is rarely critical as regards quantity. In order to repress dehydrogenation we may employ acid oxides such as those of manganese, sulfur, chromium, phosphorus, arsenic, silicon, titanium, tin, boron, and acid salts, etc., either in the form of acids, ammonium salts and hydrides, etc. In practice, the required repressive substance may be incorporated into the contact mass by co-precipitation, occlusion during precipitation, impregnation, grinding, or in any other way as by dry grinding the repressive material into the catalyst.

The following examples will further illustrate the idea of the invention:

*Example 1*

When the vapor of isopropanol is passed over a catalyst heated to 400° C. consisting of zinc oxide prepared by the gentle ignition of zinc oxalate, for every mole of the alcohol reacting there are produced about .05 moles of propylene and about .95 moles of acetone.

But if the zinc oxide is triturated with a solution of sodium carbonate and dried in such a manner that the product contains 4.5% of sodium carbonate, the olefin obtained per mole of alcohol reacting is less than .01 moles and the acetone produced more than .99 moles. If, instead of sodium carbonate, about 7% of zinc sulfate is added to the zinc oxide, there are produced about 60 moles of propylene to every 40 moles of acetone.

*Example 2*

A uranium oxide catalyst prepared by the reduction of $UO_3$ with alcohol produces from ethanol at 400° C. about .25 moles of acetaldehyde for every mole of ethylene formed. After mixing the uranium oxide with 10% of its weight of potassium carbonate, there are produced with every mole of ethylene, 10 moles of acetaldehyde. On the other hand, 15% of boric acid added to the catalyst reduces the proportion of acetaldehyde formed to .09 moles per mole of ethylene.

By the use of the terms repressive agents and suppressive agents we refer to the ultimate or final effects of these added substances and not to any theory or mechanism of operation, or to any explanation of the ionic, molecular, or atomic relationships or groupings on the surfaces of the catalyst, which may or may not favor preferential, selective, or other action whose ultimate effect is the repression referred to above.

We claim:

1. The process of dehydrogenating an oxygen containing organic compound capable of dehydrogenation which comprises passing said compound, in the absence of any compound which will react therewith, in contact with an oxide catalyst having both a dehydrogenating and a dehydrating effect, said catalyst having admixed therewith an alkaline compound of an alkali metal which represses the dehydrating effect of said oxide catalyst.

2. The invention described in claim 1 in which the alkaline compound exerts a total repressive effect.

3. The invention described in claim 1 in which the repressive agent is an alkaline oxide under the conditions of operation.

4. The invention described in claim 1 in which the catalyst contains a difficultly reducible oxide.

5. In a catalytic process of dehydrogenating an organic compound in the absence of other substances which will react therewith wherein an oxide catalyst is employed that has both a dehydrogenating and a dehydrating effect, the step of repressing the dehydrating effect by adding to said catalyst a basic compound of a metal of the group consisting of the alkali and alkaline earth metals.

6. In a catalytic process of dehydrogenating an alcohol in the absence of other substances which will react therewith wherein an oxide catalyst is employed that has both a dehydrogenating and a dehydrating effect, the step of repressing the dehydrating effect by adding to said catalyst a basic compound of a metal of the group consisting of the alkali and alkaline earth metals.

7. In a catalytic process of dehydrogenating a secondary alcohol in the absence of other substances which will react therewith wherein an oxide catalyst is employed that has both a dehydrogenating and a dehydrating effect, the step of repressing the dehydrating effect by adding to said catalyst a compound of a metal of the group consisting of the alkali and alkaline earth metals.

8. In the catalytic process of dehydrogenating isopropyl alcohol to form acetone wherein an oxide catalyst is employed that has both a dehydrogenating and a dehydrating effect, the step of repressing the dehydrating effect by adding to said catalyst a compound of an alkali metal.

9. In the process of dehydrogenating isopropyl alcohol to form acetone wherein a zinc oxide catalyst is employed which has both a dehydrogenating and a dehydrating effect and wherein propylene is normally formed due to the dehydrating effect of said catalyst, the step of repressing the formation of said propylene by adding an alkali metal compound to said catalyst.

10. The process of claim 9 in which the alkali metal compound is sodium carbonate.

In testimony whereof we affix our signatures.

HUGH STOTT TAYLOR.
WILBUR A. LAZIER.